(12) United States Patent
Hsu

(10) Patent No.: US 8,837,184 B2
(45) Date of Patent: Sep. 16, 2014

(54) SECONDARY SIDE SYNCHRONOUS RECTIFICATION CONTROL CIRCUIT AND SWITCHING CONVERTER

(75) Inventor: Ta-Ching Hsu, Taipei (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 158 days.

(21) Appl. No.: 13/459,449

(22) Filed: Apr. 30, 2012

(65) Prior Publication Data

US 2013/0094249 A1    Apr. 18, 2013

(30) Foreign Application Priority Data

Oct. 18, 2011   (TW) .............................. 100137609 A

(51) Int. Cl.
*H03B 19/03* (2006.01)
*H02M 1/08* (2006.01)
*H02M 3/335* (2006.01)

(52) U.S. Cl.
CPC ............ *H02M 1/08* (2013.01); *H02M 3/33592* (2013.01); *Y02B 70/1475* (2013.01)
USPC ...................... 363/127; 363/21.13; 363/21.14

(58) Field of Classification Search
USPC ............... 363/21, 21.06, 21.03, 21.04, 21.05, 363/21.13, 21.14, 127
See application file for complete search history.

(56) References Cited

U.S. PATENT DOCUMENTS

| | | | |
|---|---|---|---|
| 6,788,554 B2 * | 9/2004 | Havanur | 363/21.06 |
| 7,345,896 B2 * | 3/2008 | Dalal | 363/21.14 |
| 7,408,796 B2 * | 8/2008 | Soldano | 363/127 |
| 7,636,249 B2 | 12/2009 | Hu | |
| 2006/0268586 A1 * | 11/2006 | Mikulenka et al. | 363/21.14 |
| 2011/0299310 A1 * | 12/2011 | Kimura | 363/131 |

FOREIGN PATENT DOCUMENTS

| | | |
|---|---|---|
| TW | 200717978 | 5/2007 |
| TW | M333715 | 6/2008 |

* cited by examiner

*Primary Examiner* — Gary L Laxton
*Assistant Examiner* — Trinh Dang
(74) *Attorney, Agent, or Firm* — Li & Cai Intellectual Property (USA) Office

(57) ABSTRACT

A secondary side synchronous rectification control circuit is disclosed. The control circuit includes an inverted amplifier, a first comparator, and a driving unit. The inverted amplifier has an input end for receiving a drain source voltage signal from a synchronous rectification transistor and outputting an inverted amplification signal. The first comparator receives the inverted amplification signal and a first reference voltage for outputting a first comparison signal. The driving unit receives the first comparison signal and generates a driving signal according to the first comparison signal, for controlling the conduction status of the synchronous rectification transistor. The drain source voltage of the synchronous rectification transistor in the present invention is inverted amplified by an inverted amplifier, and it is connected to a comparator for generating the driving signal. The errors and defects of the turn-off timing of the driving signal may be solved and eliminated.

7 Claims, 7 Drawing Sheets

# SECONDARY SIDE SYNCHRONOUS RECTIFICATION CONTROL CIRCUIT AND SWITCHING CONVERTER

BACKGROUND OF THE INVENTION

1. Field of the Invention

The present invention relates to a secondary side synchronous rectification control circuit and a switching converter; in particular, to a secondary side synchronous rectification control circuit and a switching converter having an inverted amplifier.

2. Description of Related Art

FIG. 1 shows a circuit diagram of the conventional flyback converter circuit. As shown in FIG. 1, the flyback converter circuit has a transformer T, a primary side switch Q1, a pulse width modulation controller 10, a secondary side synchronous rectification switch Q2, a secondary side synchronous rectification control circuit 20. The pulse width modulation controller 10 generates a driving signal Vgs1 according to a feedback signal from the secondary side of the transformer T, for controlling the conduction cycle of the primary side switch Q1. The secondary side synchronous rectification control circuit 20 detects the drain source voltage Vds2 of the secondary side synchronous rectification switch Q2, for controlling the conduction cycle of the secondary side synchronous rectification switch Q2.

FIG. 1A shows a circuit diagram of the secondary side synchronous rectification control circuit 20 in FIG. 1. FIG. 2 shows a waveform diagram corresponding to the working signals in FIGS. 1 and 1A. As shown in FIG. 1A, the secondary side synchronous rectification control circuit 20 has a comparator 22 and a driving unit 24. An input end of the comparator 22 is for detecting the drain source voltage of the synchronous rectification switch, and the other input end is for receiving a reference voltage Vr, in order to generate a control signal to control the conduction cycle of the secondary side synchronous rectification switch Q2.

Generally, the conduction resistance RDS(on) of the power transistor applied to the synchronous rectification operation is very low, which only has the value between several mΩ to tens of mΩ. Thus, during the conducting period of the secondary side, the drain source voltage Vds2 cause by currents flowing through the secondary side synchronous rectification switch Q2 is very low. In addition, because of the influences of the input offset voltage of the comparator, the turn-off timing of the driving signal Vgs2 may be varied. If the turn-off timing of the driving signal Vgs2 is too early, the secondary side synchronous rectification switch Q2 is turned off early, which influences the efficiency. If the turn-off timing of the driving signal Vgs2 is too late, the secondary side synchronous rectification switch Q2 may generate current flowing backward, which generates abnormal spike voltage and extra power loss. Moreover, if the spike voltage exceeds the designed specification of the secondary side synchronous rectification switch Q2, it may also damage the secondary side synchronous rectification switch Q2.

SUMMARY OF THE INVENTION

After inverted amplifying the drain source voltage of the synchronous rectification transistor by using an inverted amplifier, the present invention also connects it to a comparator for generating a driving signal, in order to reduce the error of turn-off timing of the driving signal and solve the defects thereof.

The present invention provides a secondary side synchronous rectification control circuit which has an inverted amplifier, a first comparator, and a driving unit. The inverted amplifier has an input end for receiving a drain source voltage signal, and for outputting an inverted amplification signal. The first comparator receives the inverted amplification signal and a first reference voltage, for outputting a first comparison signal. The driving unit receives the first comparison signal, and generates a driving signal according to the first comparison signal for controlling a conduction status of the synchronous rectification transistor.

In other words, the present invention provides a secondary side synchronous rectification control circuit including an inverted amplifier which has an input end for receiving a drain source voltage signal from a synchronous rectification transistor and for outputting an inverted amplification signal, a first comparator which receives the inverted amplification signal and a first reference signal for outputting a first comparison signal, and a driving unit which receives the first comparison signal and generates a driving signal according to the first comparison signal for controlling the conduction status of the synchronous rectification transistor.

The present invention further provides a switching converter which has a transformer, a primary side switch, a pulse width modulation controller, a secondary side synchronous rectification switch, and the secondary side synchronous rectification control circuit. The transformer has a primary side winding and a secondary side winding. The primary side switch is coupled to the primary side winding. The pulse width modulation controller is used for controlling the conduction cycle of the primary side switch. The secondary side synchronous rectification switch is coupled to the secondary side winding. The secondary side synchronous rectification control circuit is used for controlling the conduction status of the secondary side synchronous rectification switch.

That is, the present invention provides a switching converter including a transformer which has a primary side winding and a secondary side winding, a primary side switch which is coupled to the primary side winding, a pulse width modulation controller for controlling the conduction cycle of the primary side switch, a synchronous rectification transistor which is coupled to the secondary winding, and a secondary side synchronous rectification control circuit. The secondary side synchronous rectification control circuit includes an inverted amplifier which has an input end for receiving a drain source voltage signal from the synchronous rectification transistor and for outputting an inverted amplification signal, a first comparator which receives the inverted amplification signal and a first reference signal for outputting a first comparison signal, and a driving unit which receives the first comparison signal and generates a driving signal according to the first comparison signal for controlling the conduction status of the synchronous rectification transistor.

The synchronous rectification control circuit provided in the present invention may precisely detect the changes of the drain source voltage of the synchronous rectification switch, for reducing the error of the turn-off timing of the driving signal. Thus, the problem of low efficiency cause by the early turn-off timing of the driving signal and the problems of abnormal spike voltage and power loss caused by the late turn-off timing of the driving signal may be avoided.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
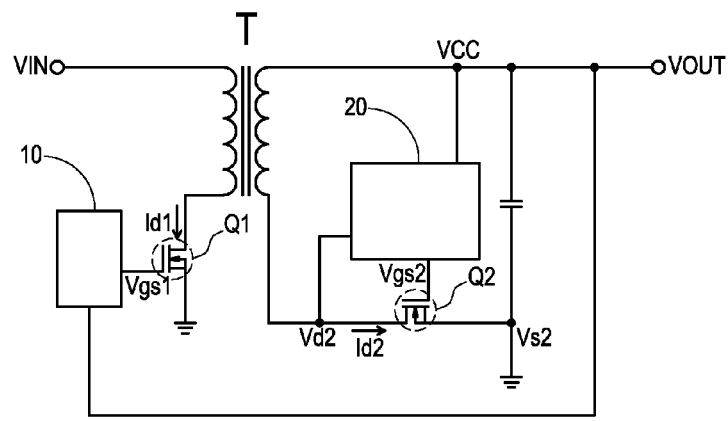
FIG. 1 shows a circuit diagram of the conventional flyback converter circuit.
Figure 1A:
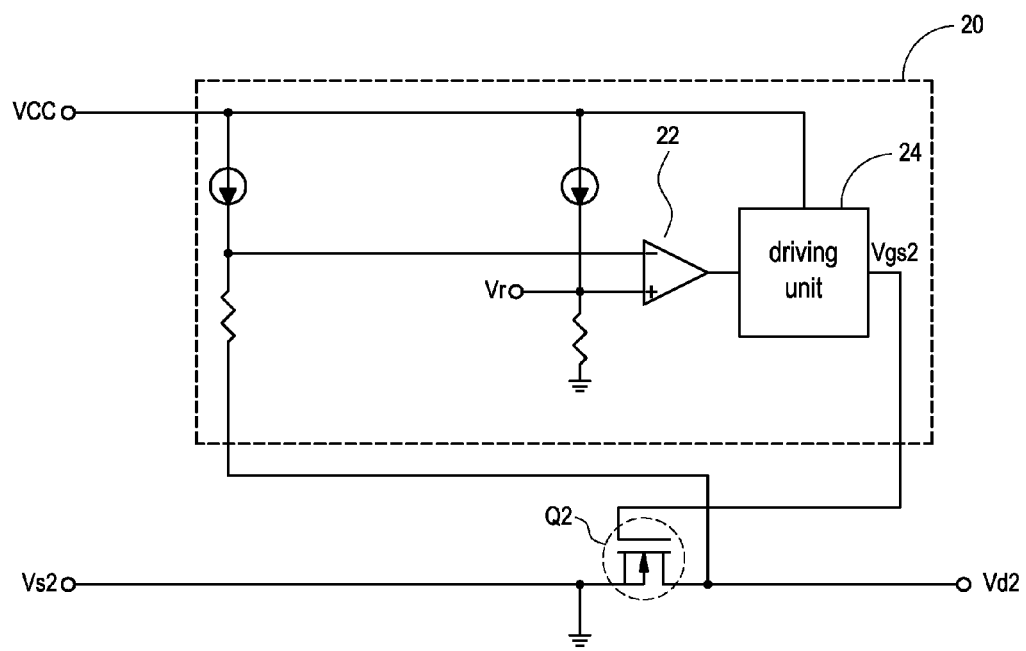
FIG. 1A shows a circuit diagram of a secondary side synchronous rectification control circuit of FIG. 1.
Figure 2:
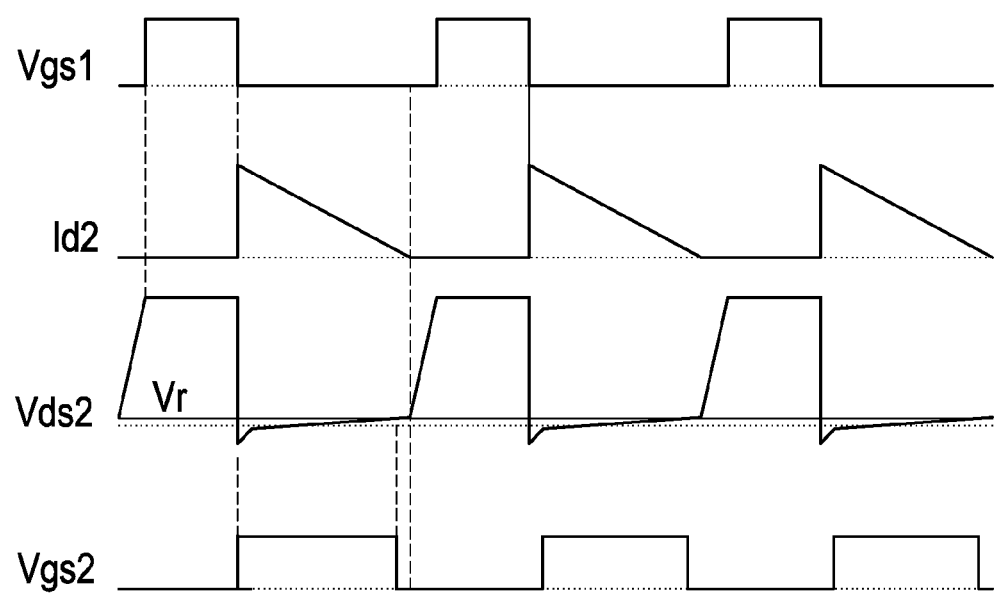
FIG. 2 shows a waveform diagram of the wording signals corresponding to FIGS. 1 and 1A.
Figure 3:
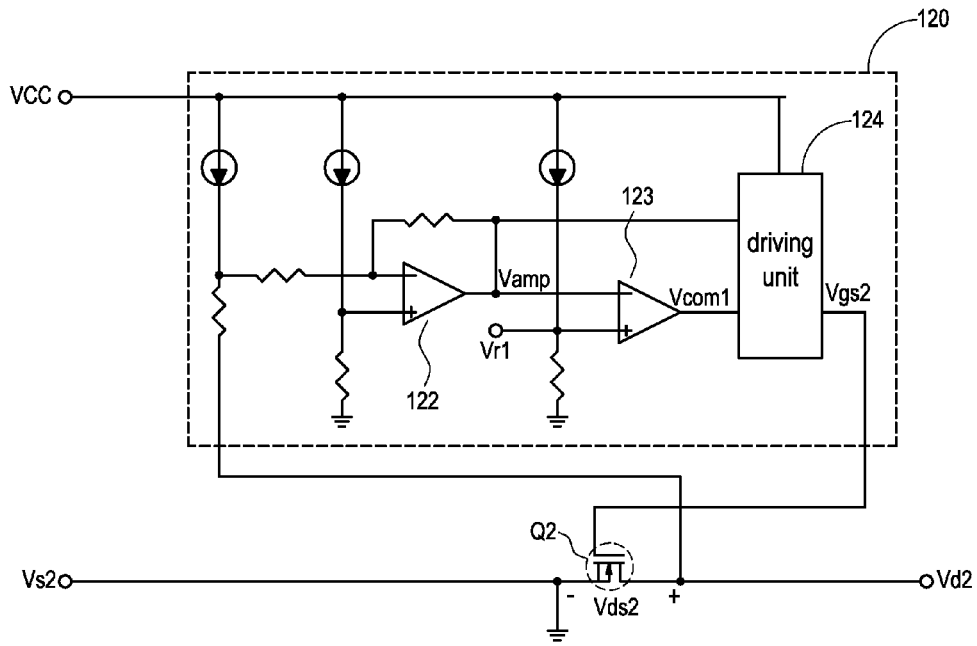
FIG. 3 shows a circuit diagram of a secondary side synchronous rectification control circuit according to an embodiment of the present invention.

FIG. 3 shows a circuit diagram of a secondary side synchronous rectification control circuit 120 according to an embodiment of the present invention. The secondary side synchronous rectification control circuit may be applied to a switching converter, such as a flyback converter or a forward converter, etc. The conduction cycle of the primary side switch of the converter may be feedback controlled by detecting the output voltage of the converter. The secondary side synchronous rectification control circuit 120 in this embodiment detects and uses the changes of the drain source voltage Vds2 of the secondary side synchronous rectification transistor Q2 as a drain source voltage signal, for controlling the conduction cycle thereof.

As shown in FIG. 3, the secondary side synchronous rectification control circuit 120 has an inverted amplifier 122, a first comparator 123, and a driving unit 124. The input end of the inverted amplifier 122 detects the drain source voltage Vds2 of the secondary side synchronous rectification transistor Q2, for outputting an inverted amplification signal Vamp. The first comparator 123 receives the inverted amplification signal Vamp and a first reference voltage Vr1, for outputting a first comparison signal Vcom1. In this embodiment, the voltage level of the first reference voltage Vr1 is positive correlated to a power supply voltage VCC which provides the necessary working power to the secondary side synchronous rectification control circuit 120. For example, if the power supply voltage VCC is a direct current voltage, the voltage level of the first reference voltage Vr1 may hold at a fixed voltage level; and if the power supply voltage VCC is a square wave voltage with fixed cycle, such as the voltage signal captured from the secondary side winding of the transformer, the voltage level of the first reference voltage Vr1 may switch between a high level and a low level corresponding to the cycle of the square wave voltage. The driving unit 124 receives the first comparison signal Vcom1, and generates a driving signal Vgs2 according to the first comparison signal for controlling the conduction status of the secondary side synchronous rectification transistor Q2.

Figure 4:
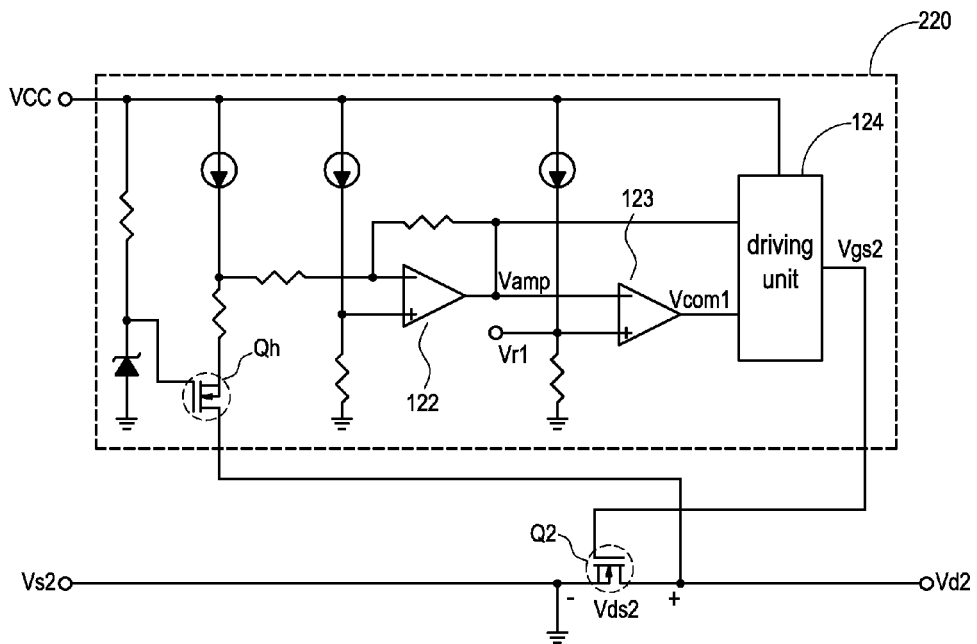
FIG. 4 shows a circuit diagram of a secondary side synchronous rectification control circuit according to another embodiment of the present invention.

FIG. 4 shows a circuit diagram of a second side synchronous rectification control circuit 220 according to another embodiment of the present invention. Comparing with the embodiment in FIG. 3, this the secondary side synchronous rectification control circuit 220 adds a protection transistor Qh, for avoiding damaging the inverted amplifier 122 and the successive circuits because of the sudden spikes of the drain voltage of the synchronous rectification transistor Q2. One end of the protection transistor Qh is coupled to the drain of the synchronous rectification transistor Q2, while the other end is coupled to the input end of the inverted amplifier 122, moreover, the gate of the protection transistor Qh receives a power supply voltage VCC. If the drain voltage of the synchronous rectification transistor Q2 exceeds the power supply voltage VCC, the synchronous rectification transistor Q2 is then turned off, for protecting the inverted amplifier 122 and the successive control circuits from being damaged by high voltage. That is, the secondary side synchronous rectification control circuit 220 of the present invention only needs to use the protection transistor Qh with high voltage-resistant, and other parts of the circuit may use cheaper low voltage components, which decreases total cost.

Figure 5:
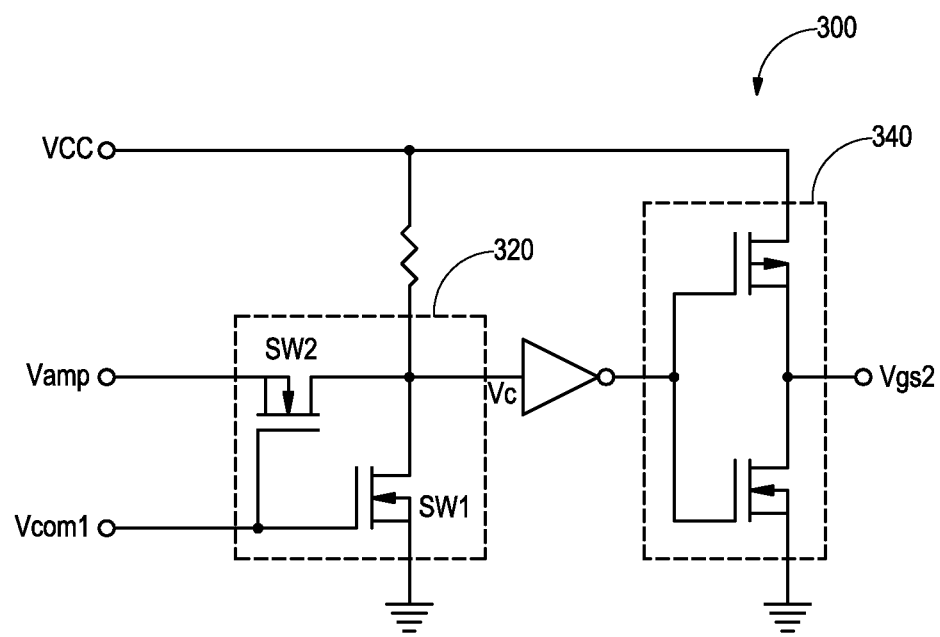
FIG. 5 shows a circuit diagram of a driving unit according to an embodiment of the present invention.
Figure 5A:
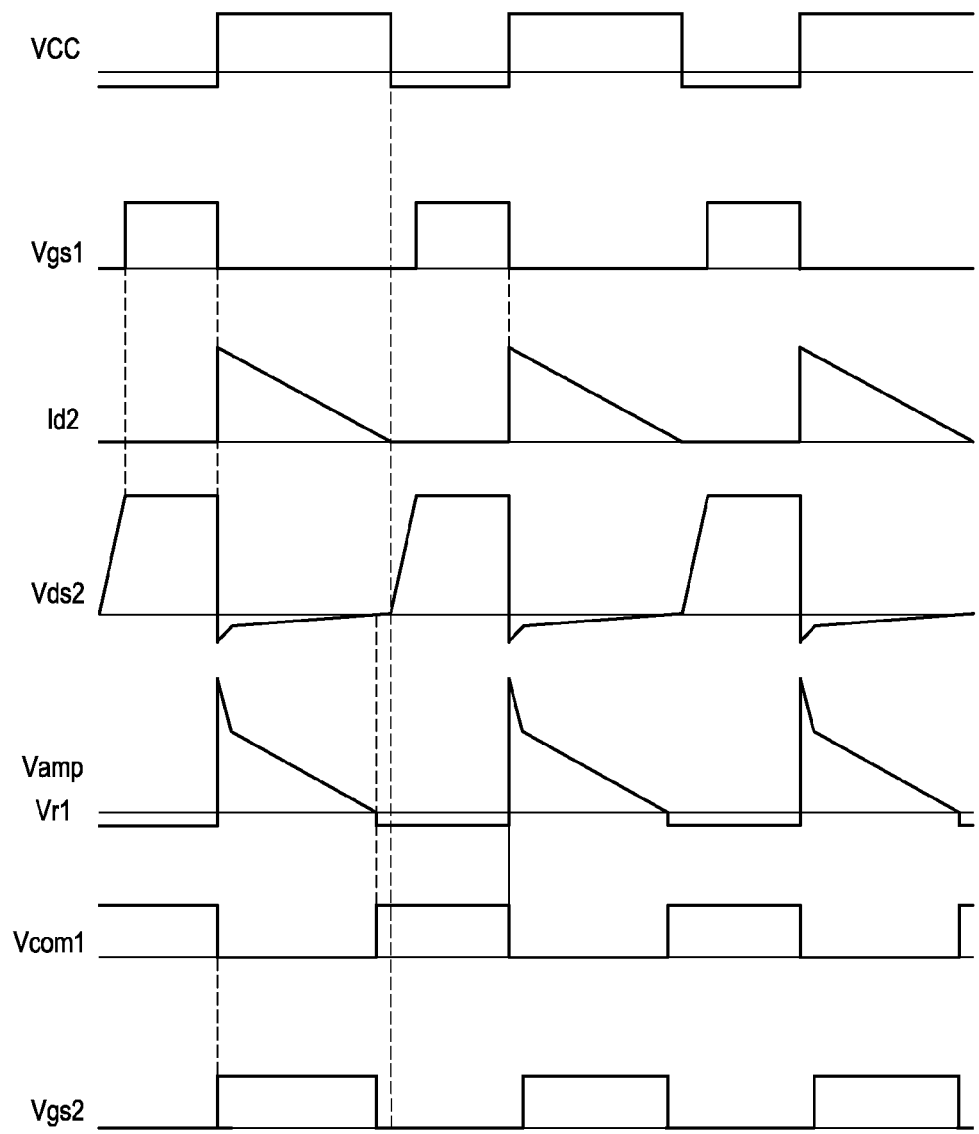
FIG. 5A shows a waveform diagram of a secondary side synchronous rectification control circuit of the driving unit corresponding to FIG. 5.

FIG. 5 shows a circuit diagram of a driving unit according to an embodiment of the present invention. FIG. 5A shows a working waveform diagram of a secondary side synchronous rectification control circuit which uses the driving unit. As shown in FIG. 5, the driving unit 300 includes a control signal generation circuit 320 and a driving level 340. The control signal generation circuit 320 receives an inverted amplification signal Vamp and a first comparison signal Vcom1, for generating a control signal Vc. The control signal Vc is inputted into the driving level 340 through an inverter, for generating a driving signal Vgs2.

The control signal generation circuit 320 has a first switch SW1 and a second switch SW2. The second switch SW2 is coupled between a power supply end the output end of the inverted amplifier 122, and the first switch SW1 is coupled between the power supply end and a ground. The drains of the two switches SW1 and SW2 are connected with each other, and the control signal Vc is captured at the connection point. In addition, the gates of the first switch SW1 and the second switch SW2 are both coupled to the output end of the first comparator 123, for receiving the first comparison signal Vcom1 outputted by the first comparator 123. In other words, the conduction cycles of the first switch SW1 and the second switch SW2 are synchronously controlled by the comparison signal Vcom1.

In the present embodiment, the power supply voltage VCC provided by the power supply end is a square wave voltage. In a preferred embodiment, the power supply voltage may be directly captured from the secondary side winding of the transformer. As shown in FIG. 5A, in the conduction cycle of the primary side, the drain source voltage Vds2 of the synchronous rectification transistor Q2 is at high voltage level, and the inverted amplifier 122 outputs the inverted amplification signal Vamp with low voltage level. At the moment, the voltage level of the inverted amplification signal Vamp is lower than the first reference voltage Vr1, and the first comparator 123 outputs the first comparison signal Vcom1 with high voltage level.

After that, when entering the start of the conduction cycle of the secondary side, the synchronous rectification transistor Q2 begins to conduct, and the secondary side of the transformer starts to discharge. At the moment, the drain source voltage Vds2 of the synchronous rectification transistor Q2 is reversed to a negative value, and the voltage value is gradually approaching to zero when time goes by. Simultaneously, the secondary side current Id2 is gradually decreasing.

After the drain source voltage Vds2 with negative voltage level is inverted amplified by the inverted amplifier, the inverted amplification signal Vamp with positive voltage level is generated. The varying trend of the inverted amplification signal Vamp is opposite to the drain source voltage Vds2 of the synchronous rectification transistor. At the time, the voltage level of the inverted amplification signal Vamp is higher than the first reference voltage Vr1, and the first comparator 123 outputs the first comparison signal Vcom1 with low voltage level. The first switch SW1 and the second switch SW2 are turned off, which makes the control signal Vc be switched to high voltage level status. The control signal Vc is converted to low voltage level signal by the inverter, and is inputted to the driving level 340, for generating the driving signal Vgs2 with high voltage level, in order to turn on the synchronous rectification transistor Q2.

After that, when the voltage level of the inverted amplification signal Vamp decreases to the level which is lower than the first reference voltage Vr1, the first comparator 123 then output the first comparison signal Vcom1 with high voltage level, which turns on the first switch SW1 and the second switch SW2 and makes the control signal Vc be switched to low voltage level status. The control signal Vc is converted to high voltage level signal by the inverter, and is inputted to the driving level, for generating driving signal Vgs2 with low voltage level, in order to turn off the synchronous rectification transistor Q2.

Figure 6:
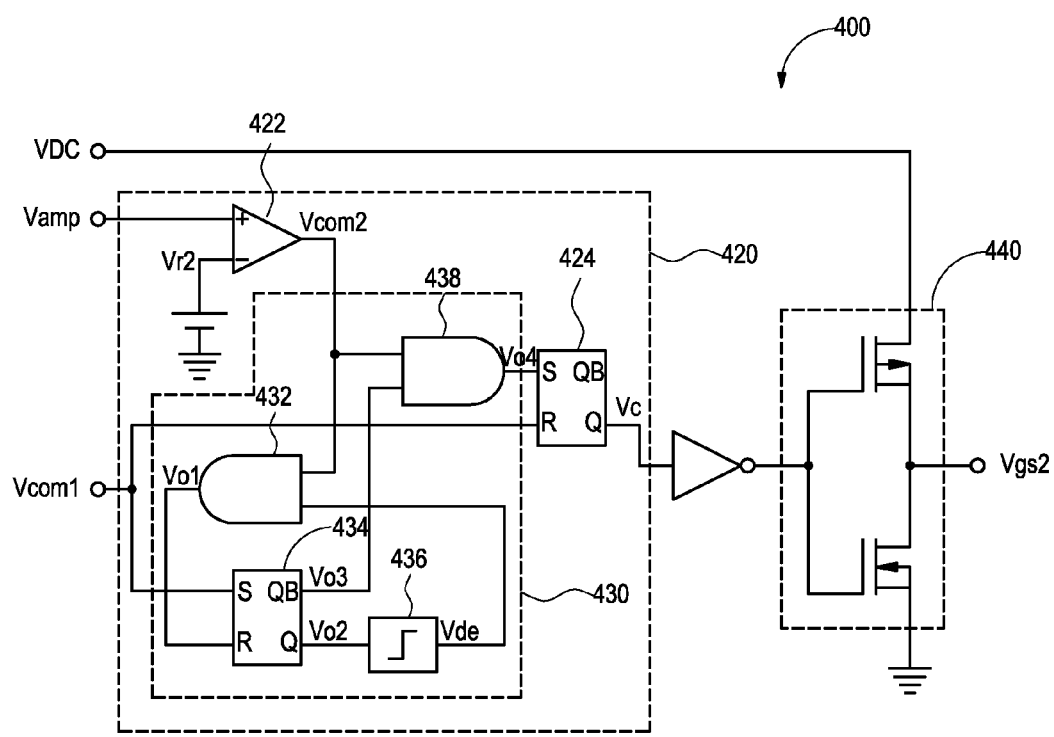
FIG. 6 shows a circuit diagram of a driving unit according to another embodiment of the present invention.
Figure 6A:
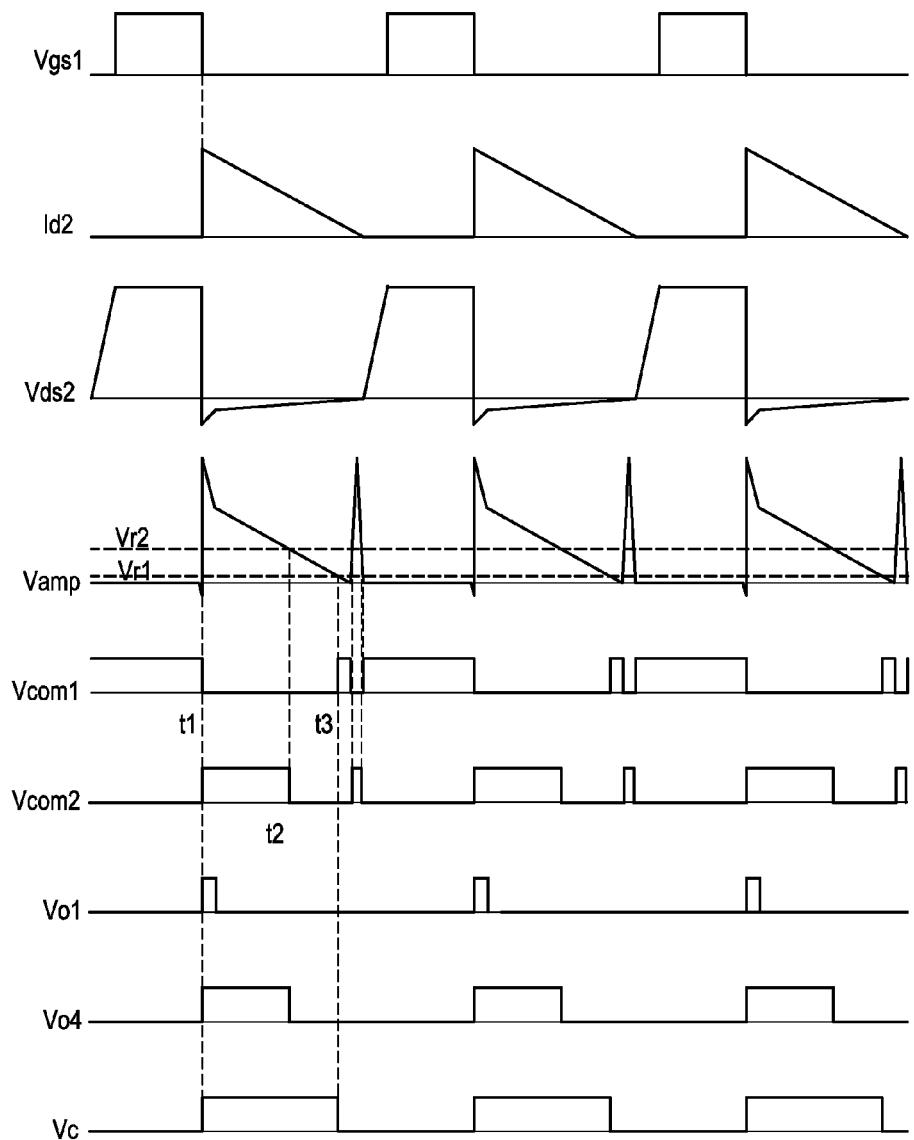
FIG. 6A shows a waveform diagram of a secondary side synchronous rectification control circuit of the driving unit corresponding to FIG. 6.

FIG. 6 shows a circuit diagram of a driving unit according to another embodiment of the present invention. FIG. 6A shows a working waveform diagram of the secondary side synchronous rectification control circuit which uses the driving unit. As shown in FIG. 6, the driving unit 400 has a control signal generation circuit 420 and a driving level 440. The control signal generation circuit 420 receives the inverted amplification signal Vamp and the first comparison signal Vcom1, for generating a control signal Vc. The control signal Vc is inputted the driving level 440 through an inverter, for generating the driving signal Vgs2.

The control signal generation circuit 420 has a second comparator 422, a first SR flip flop 424, and a peak waveform elimination circuit 430. The second comparator 422 receives the inverted amplification signal Vamp and a second reference voltage Vr2, for outputting a second comparison signal Vcom2. The first SR flip flop 424 generates the control signal Vc according to the first comparison signal Vcom1 and the second comparison signal Vcom2. The peak waveform elimination circuit 430 has a delay unit 436. The delay unit 436 generates a delay signal Vde according to the first comparison signal Vcom1, for eliminating the peak waveform of the second comparison signal Vcom2 generated at the time when the synchronous rectification transistor Q2 is turned off (please refer to FIG. 6A at the same time).

In this embodiment, the power supply voltage VCC provided by the power supply end is a direct current voltage, rather than the square wave voltage in the embodiment of FIG. 5. In the conduction cycle of the primary side, the drain source voltage Vds2 of the synchronous rectification transistor Q2 is at high voltage level, and the inverted amplifier 122 outputs the inverted amplification signal Vamp with low voltage level. At the time, the inverted amplification signal Vamp is lower than the first reference voltage Vr1, and the first comparator 123 outputs the first comparison signal Vcom1 with high voltage level.

After that, when entering the start of the conduction cycle of the secondary side, the secondary side winding of the transformer begins to discharge. At the moment, the drain source voltage Vds2 of the synchronous rectification transistor Q2 is inverted to negative, and the value is gradually approaching to zero when time goes by. Simultaneously, the secondary side current Id2 is gradually decreasing. When the synchronous rectification transistor Q2 is turned off, the secondary side current Id2 is not reduced to zero. At the time, the secondary side current Id2 flows through the body diode of the synchronous rectification transistor Q2, which makes the drain source voltage Vds2 of the synchronous rectification transistor Q2 suddenly increase and generate a peak waveform.

The varying trend of the inverted amplification signal Vamp generated by amplifying the drain source voltage Vds2 through the inverted amplifier 122 is opposite to the drain source voltage Vds2. That is, at the beginning of the conduction cycle of the secondary side, the inverted amplification signal Vamp is high and is gradually decreasing when the time goes by. When the synchronous rectification transistor Q2 is turned off, the inverted amplification signal Vamp may also generate a corresponding peak waveform. Thus, comparing with the embodiment in FIG. 5A, the first comparison signal Vcom1 generated by the first comparator 123 in the present embodiment may generate an extra pulse during the time when the synchronous rectification transistor Q2 is turned off and the secondary side current is not zero. The existence of the pulse may lead to synchronous rectification control errors.

For solving this problem, the present embodiment uses peak waveform elimination circuit 430 for eliminating the influences to the control signal Vc caused by the peak waveform. As shown in FIG. 6, the peak waveform elimination circuit 430 has a first AND gate 432, a second SR flip flop 434, a delay unit 436, and a second AND gate 438. The first AND gate 432 receives the second comparison signal Vcom2 and the delay signal Vde outputted by the delay unit 436, for generating a first output signal Vo1. The second SR flip flop 434 receives the first comparison signal Vcom1 and the first output signal Vo1, for generating a second output signal Vo2 and a third output signal Vo3 which are complementary to each other. The delay unit 436 receives the second output signal Vo2 for generating the delay signal Vde. The second AND gate 438 receives the second comparison signal Vcom2 and the third output signal Vo3, for generating a fourth output signal Vo4. The first SR flip flop 424 receives the first comparison signal Vcom1 and the fourth output signal Vo4, for generating the control signal Vc. The control signal Vc may pass a inverter and be inputted to the driving level 440, for generating the driving signal Vgs2 and turning on or off the synchronous rectification transistor Q2.

Please refer to FIGS. 6 and 6A at the same time. In the conduction cycle of the primary side, the drain source voltage Vds2 of the synchronous rectification transistor Q2 is at high voltage level, and the inverted amplifier 122 outputs the inverted amplification signal Vamp with low voltage level. At the time, the voltage level of the inverted amplification signal Vamp is lower than the first reference voltage Vr1, and the first comparator 123 outputs the first comparison signal Vcom1 with high voltage level. In addition, the voltage level of the inverted amplification signal Vamp is also lower than the second reference voltage Vr2, and the second comparator 422 outputs the second comparison signal Vcom2 with low voltage level. At the time when the first comparison signal Vcom1 is high and the second comparison signal is low, the first SR flip flop 424 output low level control signal Vc. The control signal Vc is inputted into the driving level 440 through the inverter, and generates low level driving signal Vgs2.

When entering the beginning of the conduction cycle of the secondary side, the secondary side winding of the transformer starts to discharge. At the time t1, the drain source voltage Vds2 of the synchronous rectification transistor Q2 is reversed to negative value. The voltage level of the inverted amplification signal Vamp is higher than the first reference voltage Vr1, and the first comparator 123 outputs the first comparison signal Vcom1 with low voltage level. The voltage level of the inverted amplification signal Vamp is also higher than the second reference voltage, and the second comparator 422 outputs the second comparison signal Vcom2 with high voltage level. The first AND gate 432 outputs high level first output signal Vo1 to the reset end R of the second SR flip flop 434, which makes the negative output end QB of the second SR flip flop 434 outputs the third output signal Vo3 with high voltage level to the second AND gate 438. The second AND gate 438 receives the high level third output signal Vo3 and the high level second comparison signal Vcom2, then outputs the fourth output signal Vo4 with high voltage level to the setting end S of the first SR flip flop 424, which makes the positive output end Q of the first SR flip flop outputs high level control signal Vc.

The voltage level of the inverted amplification signal Vamp is gradually decreasing when the time goes by. At the time t2, the voltage level of the inverted amplification signal Vamp is lower than the second reference voltage Vr2. At the moment, the second comparison signal Vcom2 is switched to low level while the first comparison signal Vcom1 still remain at low level. Thus, the fourth output signal Vo4 generated by the second AND gate 438 is switched to low level from high level. The voltage level of the control signal Vc outputted by the first SR flip flop 424 is not changed.

After that, at time t3, the voltage level of the inverted amplification signal Vamp decreases to the level which is lower than the first reference voltage Vr1. At the moment, the first comparison signal Vcom1 is switched to high level from low level, which makes the voltage level of the control signal Vc outputted by the first SR flip flop 424 be switched to low level from high level. Simultaneously, the high level first comparison signal Vcom1 is inputted to the setting end S of the second SR flip flop 434, which makes the positive output end of the second SR flip flop 434 generate the second output signal Vo2 with high voltage level. The delay unit 436 receives the high level second output signal Vo2, and delays the second output signal Vo2 for a predetermined time, in order to generate a delay signal Vde and output it to the first AND gate 432.

Then, at the time when the synchronous rectification transistor Q2 is turned off and the secondary side current is not returned to zero, the inverted amplification signal Vamp generates a peak waveform, and the voltage level of the peak waveform exceeds the first reference voltage Vr1 and the second reference voltage Vr2. At the moment, the first comparison signal Vcom1 is switched to low level from high level, and the second comparison signal Vcom2 is switched to high level from low level. The first AND gate 432 determines the voltage level of the outputted first output signal Vo1 according to the high level second comparison signal Vcom2 and the delay signal Vde transmitted from the delay unit 436.

By properly setting the delay time of the delay unit 436, the delay signal Vde may remain at low level during the time of the peak waveform of the inverted amplification signal Vamp (that is, the time when the second comparison signal Vcom2 is at high voltage level). Thus, the first AND gate 432 may continuously output the first output signal Vo1 with low voltage level to the reset end R of the second SR flip flop 434, for avoiding the negative output end QB of the second SR flip flop 434 outputting high voltage level signals, in order to ensure that the control signal Vc remains at low level.

The synchronous rectification control circuit provided by the present invention may precisely detect the voltage level changes of the drain source voltage of the synchronous rectification switch, for reducing the errors of the turn-off timing of the driving signal. Therefore, the low efficiency problem cause by early turn-off timing of the driving signal and the abnormal voltage spike and power loss cause by late turn-off timing of the driving signal may be avoided.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A secondary side synchronous rectification control circuit, comprising:

an inverted amplifier having an input end for receiving a drain source voltage signal from a synchronous rectification transistor, and for outputting an inverted amplification signal;

a first comparator for receiving the inverted amplification signal and a first reference voltage, and for outputting a first comparison signal; and a driving unit for receiving the first comparison signal and generating a driving signal according to the first comparison signal, in order to control a conduction status of the synchronous rectification transistor, wherein the driving unit is coupled to a power supply end for receiving a direct current voltage, and the driving unit comprises:

a second comparator for receiving the inverted amplification signal and a second reference signal, and for outputting a second comparison signal;

a first SR flip flop for generating the driving signal according to the first comparison signal and the second comparison signal; and a peak waveform elimination circuit having a delay unit which generates a delay signal according to the first comparison signal, for eliminating a peak waveform of the second comparison signal generated at the time when the synchronous rectification transistor is turned off, wherein the peak waveform elimination circuit comprises:

a first AND gate for receiving the second comparison signal and the delay signal, and for generating a first output signal;

a second SR flip flop for receiving the first comparison signal and the first output signal, and for generating a second output signal and a third output signal which are complementary to each other;

the delay unit for receiving the second output signal, and for generating the delay signal; and a second AND gate for receiving the second comparison signal and the third output signal, and for generating a fourth output signal, wherein the first SR flip flop receives the first comparison signal and the fourth output signal for generating the driving signal.

2. The secondary side synchronous rectification control circuit according to claim 1, further comprising a protection transistor, wherein one end of the protection transistor is coupled to a drain of the synchronous rectification transistor, and the other end is coupled to the input end of the inverted amplifier, moreover, a gate of the protection transistor is coupled to the power supply end for receiving a power supply voltage.

3. The secondary side synchronous rectification control circuit according to claim 2, wherein the driving unit is coupled to the power supply end for receiving a secondary side square wave voltage, and the first reference voltage switches between a high level and a low level according to the secondary side square wave voltage.

4. A switching converter, comprising:
a transformer having a primary side winding and a secondary side winding;
a primary side switch coupled to the primary side winding;
a pulse width modulation controller for controlling a conduction cycle of the primary side switch;
a synchronous rectification transistor coupled to the secondary side winding; and
a secondary side synchronous rectification control circuit comprising:
an inverted amplifier having an input end for receiving a drain source voltage signal from the synchronous rectification transistor, and for outputting an inverted amplification signal;
a first comparator for receiving the inverted amplification signal and a first reference voltage, and for outputting a first comparison signal; and
a driving unit for receiving the first comparison signal, and for generating a driving signal according to the first comparison signal, in order to control a conduction status of the synchronous rectification transistor, wherein the driving unit comprises:
a second comparator for receiving the inverted amplification signal and a second reference voltage, and for outputting a second comparison signal;
a first SR flip flop for generating the driving signal according to the first comparison signal and the second comparison signal; and
a peak waveform elimination circuit having a delay unit which generates a delay signal according to the first comparison signal, for eliminating a peak waveform of the second comparison signal at the time when the synchronous rectification transistor is turned off, wherein the peak waveform elimination circuit comprises:
a first AND gate for receiving the second comparison signal and the delay signal, and for generating a first output signal;
a second SR flip flop for receiving the first comparison signal and the first output signal, and for generating a second output signal and a third output signal which are complementary to each other;
the delay unit for receiving the second output signal, and for generating the delay signal; and
a second AND gate for receiving the second comparison signal and the third output signal, and for generating a fourth output signal, wherein the first SR flip flop receives the first comparison signal and the fourth output signal, for generating the driving signal.

5. The switching converter according to claim 4, further comprising a high voltage protection transistor which has a drain connecting to a drain of the synchronous rectification transistor, a source coupled to the input end of the inverted amplifier, and a gate coupled to a power supply end, for receiving a power supply voltage.

6. The switching converter according to claim 5, wherein the power supply end is one end of the secondary side winding of the transformer.

7. The switching converter according to claim 5, wherein the driving unit is coupled to the power supply end for receiving a direct current voltage.

* * * * *